United States Patent [19]

Ogawa

[11] Patent Number: 4,772,098
[45] Date of Patent: Sep. 20, 1988

[54] LIQUID CRYSTAL PROJECTOR WITH COOLING SYSTEM

[75] Inventor: Masahiro Ogawa, Tokyo, Japan

[73] Assignee: Casio Computer Co. Ltd., Tokyo, Japan

[21] Appl. No.: 938,555

[22] Filed: Dec. 5, 1986

[30] Foreign Application Priority Data

Dec. 20, 1985 [JP] Japan ................................. 60-285781
Aug. 20, 1986 [JP] Japan ................................. 61-194907

[51] Int. Cl.⁴ ............................................... G02F 1/13
[52] U.S. Cl. .................... 350/331 T; 353/54; 353/60
[58] Field of Search ............... 350/331 R, 331 T, 330, 350/351; 353/52, 54, 60

[56] References Cited

U.S. PATENT DOCUMENTS

| | | | |
|---|---|---|---|
| 1,895,887 | 1/1933 | Lorenz | 353/54 |
| 2,837,965 | 6/1958 | Goldsmith | 353/52 |
| 3,723,739 | 3/1973 | Horton | 350/351 |
| 3,895,866 | 7/1975 | de Quervain | 353/30 |
| 4,167,310 | 9/1979 | Persha et al. | 353/52 |
| 4,196,976 | 4/1980 | Hoffman | 350/331 R |
| 4,669,842 | 6/1987 | Yomoda et al. | 353/122 |
| 4,671,634 | 6/1987 | Kizaki et al. | 353/122 |

FOREIGN PATENT DOCUMENTS

| | | | |
|---|---|---|---|
| 0080622 | 5/1983 | Japan | 350/331 T |
| 0211742 | 12/1983 | Japan | 350/330 |
| 0231519 | 12/1984 | Japan | 350/331 T |
| 0059316 | 3/1986 | Japan | 350/331 T |

Primary Examiner—Stanley D. Miller
Assistant Examiner—Tai Van Duong
Attorney, Agent, or Firm—Frishauf, Holtz, Goodman, Woodward

[57] ABSTRACT

A liquid crystal display device for enlarging and projecting an image displayed on a transmission liquid crystal display panel through a projecting lens onto a screen by radiating a light from a light source to the panel, has a heat pipe inserted into a transparent cooling vessel filled with transparent cooling liquid for externally radiating heat absorbed by the liquid to suppress the temperature rise of the panel due to the light incident to the panel.

4 Claims, 4 Drawing Sheets

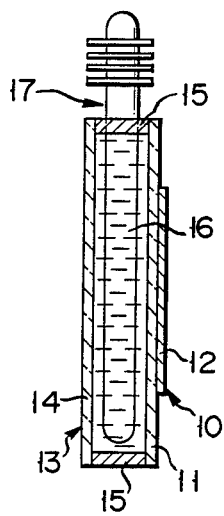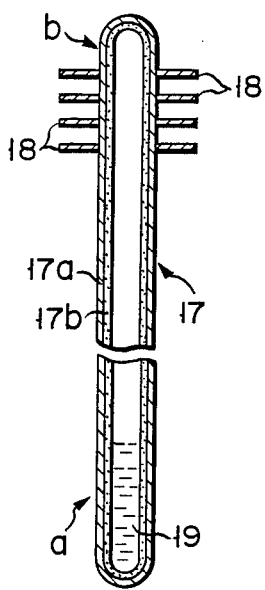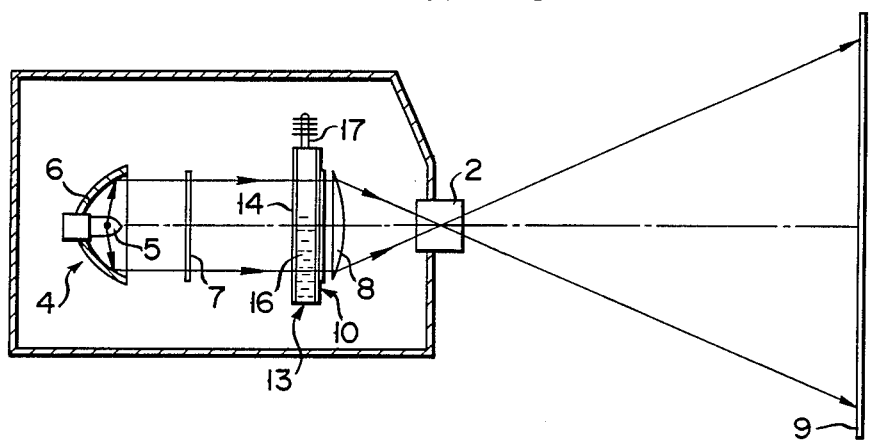

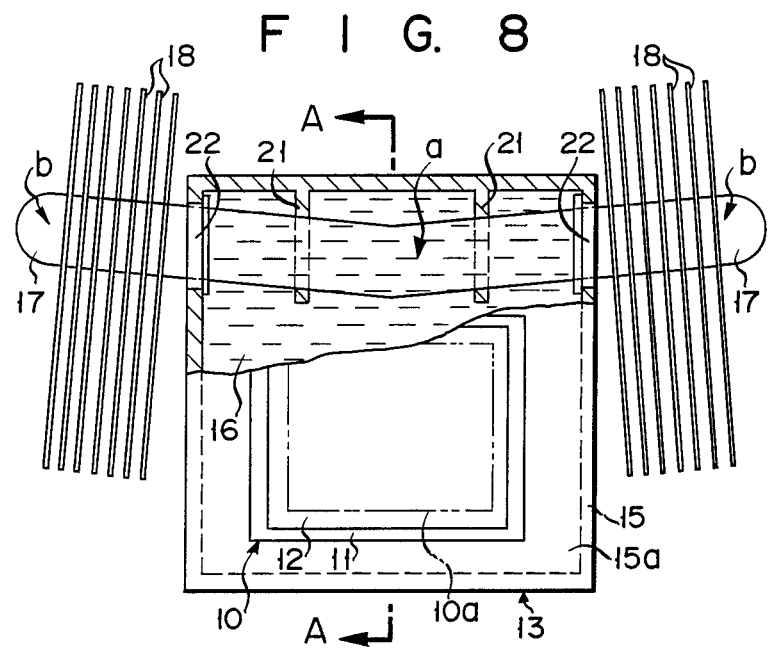
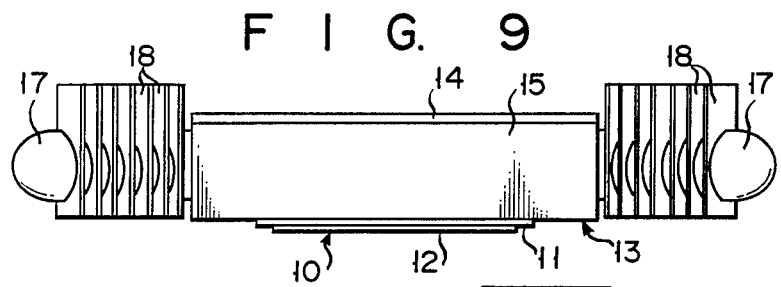
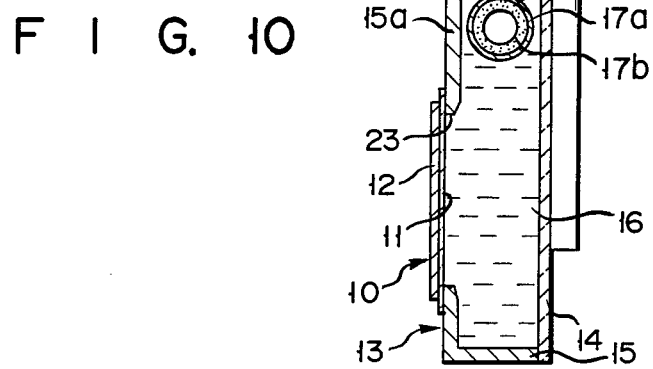

LIQUID CRYSTAL PROJECTOR WITH COOLING SYSTEM

BACKGROUND OF THE INVENTION

The present invention relates to a liquid crystal display device used for a liquid crystal projector.

A liquid crystal projector displays an image through a transmission liquid crystal display panel, enlarges and projects the image displayed on the panel through a projection lens onto a screen, and is constructed as described below.

FIG. 1 is a view for illustrating a principle of a conventional liquid crystal projector. In FIG. 1, projection lens 2, associated with a plurality of optical lenses, is provided on the front surface of projector case 1. Transmission dot matrix liquid crystal display panel 3 is opposed to lens 2 in case 1. Light source 4 is provided behind panel 3 in case 1, and has light source lamp 5 and reflector 6 for reflecting the light emitted from lamp 5 toward the back surface of panel 3. Infrared ray components are removed by infrared ray-removing filter (an infrared ray reflection or absorption filter) 7 from the light of light source 4, and the light is incident to panel 3. The light transmitted through panel 3 and hence the displaying image of panel 3 is condensed by condensing lens 8, enlarged by lens 2, and projected onto screen 9.

More particularly, this projector enlarges the image displayed on the liquid crystal display panel, and projects the image on the screen. According to the projector, the image displayed on the display panel, which has a small screen size, can be enlarged to be easily observed. The prior art of such a liquid crystal projector is disclosed in U.S. Pat. No. 3,895,866.

In the above-mentioned liquid crystal projector, panel 3 is heated by infrared ray components of the light incident to panel 3 (because the infrared ray components of the light emitted from light source 4 to panel 3 is removed by filter 7 to some degree but not completely removed). Further, since panel 3 is heated by the temperature rise in case 1 due to the heat radiated from light source 4, the liquid crystal temperature in panel 3 rises to thereby cause the display contrast of panel 3 to decrease. Thus, there arise problems that a clear image cannot be projected on screen 9 and the lifetime of the liquid crystal in panel 3 is reduced. The temperature rise in case 1 can be suppressed to some degree by ventilation, but a xenon or halongen lamp of high luminance, generally used as lamp 5 of the liquid crystal projection, radiates considerable heat. Therefore, the temperature rise in case 1 cannot be effectively suppressed only by ventilation to reduce thermal influence to panel 3.

SUMMARY OF THE INVENTION

An object of the present invention is to provide a liquid crystal display device for a liquid crystal projector which suppresses a temperature rise in a liquid crystal display panel due to the infrared ray components of the light incident to the panel and the heat radiated from a light source and, thus, also prevents a decrease in the display contrast and a decrease in the lifetime of the liquid crystal.

According to the present invention, there is provided a liquid crystal display device comprising:
a light source;
projecting lens means provided in an optical path of a light from the light source;
liquid crystal display panel means provided between the light source and the projecting lens means, which enlarges an image to be displayed, the image being obtained by the light irradiated from the light source to the panel means to project the image onto a screen;
a transparent cooling vessel, bonded at one side surface to the panel means, and filled with transparent cooling liquid therein; and
heat pipe means, partially inserted into the vessel, having a heat absorber located within the vessel and a heat radiator located outside of the vessel for externally radiating the heat absorbed by the liquid.

Since the liquid crystal display device, constructed as described above according to the present invention, comprises a liquid crystal display panel on one side surface of the cooling vessel, the display panel is cooled by the cooling liquid in the vessel, the heat absorbed by the liquid in the vessel is externally radiated by the heat pipe to suppress the temperature rise of the liquid, and the cooling of the panel is thereby efficiently maintained. According to the liquid crystal display device of the invention, the temperature rise of the display panel due to the infrared ray components of the light incident to the display panel and the heat radiated from the light source can be suppressed to a low value to prevent the display contrast and the lifetime of the liquid crystal from decreasing; and since the vessel is transparent, the light transmitted through the display panel is not interrupted by the vessel.

BRIEF DESCRIPTION OF THE DRAWINGS

FIGS. 2 and 3 are fragmentary front and longitudinal sectional side views of a first embodiment of a liquid crystal display device according to the present invention;

FIG. 4 is an enlarged sectional view of a heat pipe inserted into a cooling vessel;

FIG. 5 is a partial longitudinal sectional side view of a liquid crystal projector using the liquid crystal display device of the invention;

FIGS. 8 to 9 are fragmentary sectional front and plan views of a third embodiment of a liquid crystal display device according to the invention; and FIG. 10 is a sectional view taken along the line A—A of 8.

DETAILED DESCRIPTION OF THE PREFERRED EMBODIMENTS

A first embodiment of the present invention will be described in more detail with reference to FIGS. 2 to 5.

Figure 2:
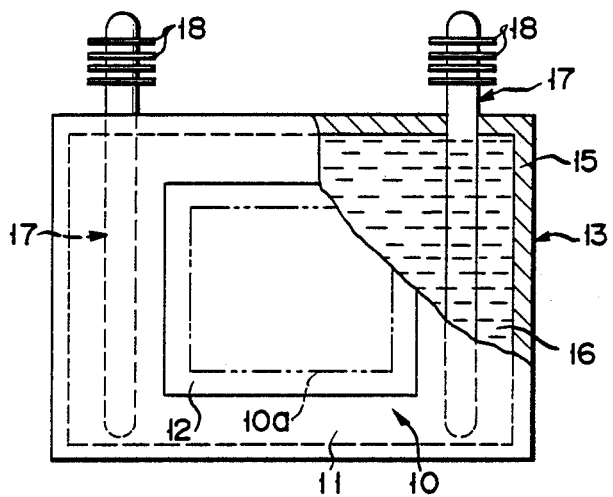

In FIGS. 2 and 3, a transmission dot matrix liquid crystal display panel 10 of TN (Twisted nematic) type seals a nematic liquid crystal arranged between a pair of transparent glass substrates 11 and 12 in such a manner that the molecules of the liquid crystal are twisted substantially at 90 degrees between substrates 11 and 12, a number of scanning electrodes (common electrodes) and signal electrodes (segment electrodes) formed to alternatively cross perpendicularly therebetween in a matrix shape on the opposed surfaces of both substrates 11 and 12, and polarization plates (not shown) bonded on the outer surfaces of both substrates 11 and 12 so that the polarization axes thereof cross perpendicularly to one another.

One substrate 11 of panel 10 has an area sufficiently larger than screen 10a (displaying area) of panel 10, and forms one wall surface of cooling vessel 13 for cooling panel 10. Vessel 13 has a thin, sealed box shape with substrate 11 and transparent plate (made of a glass or acrylic resin plate) 14, having the same area as substrate 11, in which both side transparent surfaces thereof are bonded through frame 15 to one another; transparent cooling liquid 16, such as an aqueous ethylene glycol solution, is filled therein.

Heat pipes 17 are inserted in both sides of vessel 13, outside the region of the screen or displaying area 10a of panel 10, so as not to block the displaying area 10a from light emitted from the light source 4. Pipes 17 externally radiate heat absorbed by liquid 16 in vessel 13. The portions of pipes 17 which are inserted into vessel 13 are heat absorbing portions a, the portions of pipes 17, projected above vessel 13 are heat radiating portions b, and a plurality of radiating fins 18 are formed on the outer peripheral surfaces of the portions b. FIG. 4 is a sectional view of pipe 17. Pipe 17 is constructed to seal volatile work fluid (and hence heat transfer medium) 19 in metal pipe 17a blocked at both ends thereof and formed with asbestos wicks 17b on the inner surfaces thereof. Wicks 17b guide fluids 19 in pipes 17 from heat radiating portions b to heat absorbing portions a by means of a capillary phenomenon, and are provided on the entire inner surfaces of pipes 17a. Fluid 19 transfers heat by two reversible phase changes of evaporation and condensation. Fluid 19 employs fluid having a high latent heat coefficient and excellent impregnancy, such as Freon. Fluid 19 is evaporated with the temperature rise by heat exchange with liquid 16 in vessel 13 in the portions a of pipes 17, thus raised in pipes 17 as vapor, and condensed and liquified by external heat radiation in the heat radiating portions of pipes 17. Fluid 19, derived with latent heat thereof from the fluid and liquified, is impregnated to wicks 17b, and again guided to heat absorbing portions 17 by means of a capillary phenomenon.

Figure 1:
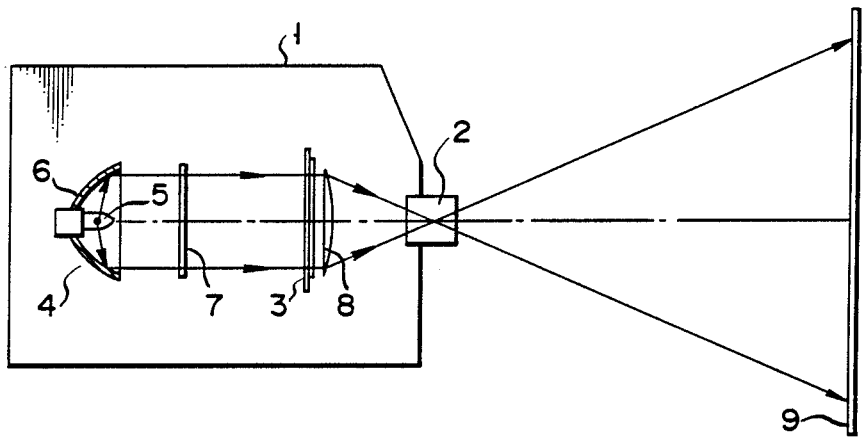
FIG. 1 is a longitudinal sectional side view of a general liquid crystal projector of prior art.

The liquid crystal display device thus constructed is disposed in case 1 of the liquid crystal projector shown in FIG. 5, and installed, for example, so that the surface of vessel 13 provided with panel 10 is directed toward lens 2 and the opposite surface is directed toward light source 4. Since the liquid crystal projector shown in FIG. 5 is constructed similarly to that shown in FIG. 1 in principle, like reference numerals designate the same or equivalent parts as those in FIG. 1, and detailed description thereof will be omitted.

Even if panel 10 is heated by a temperature rise in case 1 due to infrared ray components of the light incident to panel 10 and heat radiated from light source 4 in the liquid crystal display device, panel 10 is cooled by liquid 16 in vessel 13, and liquid 16 exchanges heat with pipes 17 by convection in vessel 13. Thus, heat absorbed by liquid 16 is externally radiated by pipes 17 to suppress the temperature rise of liquid 16, thereby always maintaining a high cooling efficiency of panel 10 by liquid 16. Therefore, according to the liquid crystal display device of this invention, the temperature rise of panel 10, due to the infrared ray components of the light incident to panel 10, and heat radiated from light source 4 can be suppressed to a low value to prevent a decrease in the display contrast and a decrease in the lifetime of the liquid crystal, and since vessel 13 is transparent, the light radiated from light source 4 is not interrupted by vessel 13, but incident through vessel 13 to panel 10. Consequently, the displaying luminance of panel 10 does not decrease.

In FIG. 5, the embodiment of the liquid crystal display device is mounted so that the surface of panel 10 of vessel 13 is directed toward lens 2. However, the present invention is not limited to this particular embodiment. For example, the surface of panel 10 of vessel 13 may be directed toward light source 4 and the opposite surface may be directed toward lens 2. Plate 14, opposite to panel 10 of vessel 13, may employ an ordinary transparent plate such as glass plate, but when the liquid crystal display device is arranged in the state as shown in FIG. 5, plate 14 may employ an infrared ray removing filter (infrared ray absorbing or reflecting filter). When plate 14 employs on infrared ray removing filter, the infrared ray components of the light incident to panel 10 can also be removed by filter 7 of light source 4. Thus, the temperature rise of panel 10 may further be effectively prevented.

Figure 6:
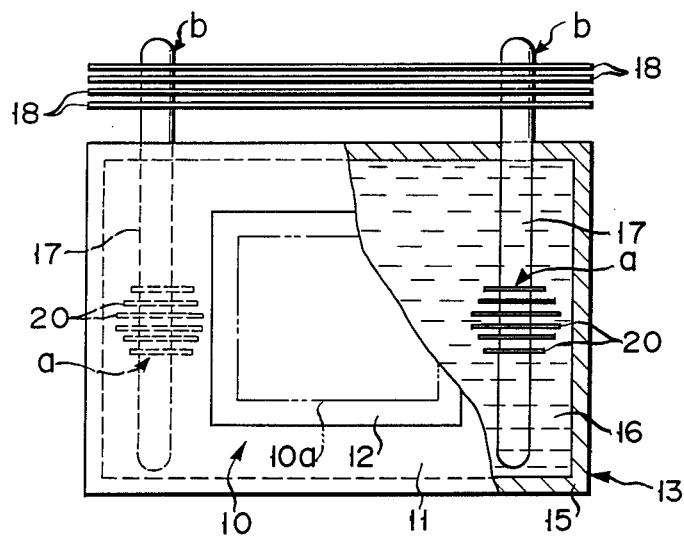
FIGS. 6 and 7 are fragmentary front and longitudinal sectional side views of a second embodiment of a liquid crystal display device according to the present invention.
Figure 7:
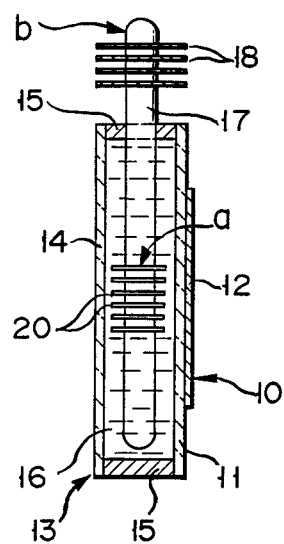

FIGS. 6 and 7 show a second embodiment of the present invention. In this second embodiment, a plurality of heat exchange fins 20 and 20 are respectively provided an the heat absorbing portions a of heat pipes 17 inserted into both sides of vessel 13 to further efficiently exchange heat between cooling liquid 16 in cooling vessel 13 and pipes 17. Heat radiating fins 18 and 18 provided on heat radiating portions b of pipes 17 and 18 are provided with large areas of strip shape, and mounted at both end sides thereof on pipes 17 to enhance the external heat radiating efficiency. The rest of the construction is the same as that of the first embodiment.

FIGS. 8 to 10 show a third embodiment of the present invention. In the third embodiment, like reference numerals designate the same or equivalent parts as those in the first and second embodiments, and detailed description thereof will be omitted.

In the third embodiment, only one heat pipe 17 is employed, in order to reduce the size of cooling vessel 13 of the liquid crystal display device. Pipe 17 extends between both side surfaces of vessel 13 in the top of vessel 13 with an externally projecting arrangement. More specifically, pipe 17 has heat absorbing portion a formed at the center thereof, heat radiating portions b and b formed at both ends, and large heat radiating fins 18 provided in a longitudinally long strip shape. Pipe 17 is bent at the center thereof at its lowest height and both end sides thereof are inclined in upward directions. A pair of heat pipe supports 21 are integrally formed with frame 15. Pipe 17 is supported by supports 21, and fixed by heat pipe fastening bushes 22 with both side faces of frame 15 in a water-tight manner. In the first and second embodiments described above, one of substrates 11 and 12 of panel 10 has a large area so that one wall surface of vessel 13 is formed by substrate 11. However, in the third embodiment, an end plate 15a, which forms one surface of vessel 13, is integrally formed with frame 15 of vessel 13, opening 12 having an area surrounding screen 10a of panel 10 is perforated at plate 15a, and panel 10 is mounted on plate 15a to block opening 12.

In the embodiment described above, cooling liquid 14 in vessel 13 is cooled by pipe 17. It is, therefore, not necessary to provide space for pipe 17 in both sides of vessel 13 as in the first and second embodiments. Thus, vessel 13 may be reduced in size, and since only one pipe 17 is sufficient, the cost of the liquid crystal display device can be reduced. In the embodiment described above, both ends of pipe 17 project from both sides of vessel 13. Thus, even if fins 18, provided at heat radiating portions b of both ends of pipe 17, are formed with a large area, fins 18 do not interfere with one another. Therefore, with fins 18 of a large area, the heat radiating efficiency of pipe 17 can be enhanced. When formed in a longitudinal long strip shape, fins 18 do not, though large in area, markedly project in the forward and backward directions from the liquid crystal display device. In the embodiment described above, pipe 17 is provided at the top of vessel 13. However, pipe 17 may be provided in the bottom of vessel 13.

In the embodiments described above, one wall surface of vessel 13 is formed of one substrate 11 of panel 10 to integrally provide the liquid crystal display panel with one side surface of vessel 13. However, the present invention is not limited to these particular embodiments. For example, the panel may be mounted on one side surface of a sealed cooling vessel formed with transparent plates on both side surfaces. The liquid crystal display panel may be of a simple matrix type or a TFT (Thin Film Transistor) type.

What is claimed is:

1. A liquid crystal projector, comprising:
   a light source for emitting light over an optical path;
   lens means provided in the optical path of the light emitted from the light source for projecting the light onto a screen;
   liquid crystal display panel means including a displaying area and provided between the light source and the lens means, for producing an image to be displayed on said displaying area, wherein said image is enlarged when light emitted from the light source to the panel means is projected by the lens means onto said screen;
   a transparent cooling vessel bonded at one side surface to the panel means and filled with transparent cooling liquid; and
   heat pipe means partially inserted in the vessel without blocking said displaying area of said panel means from light emitted from said light source, and including a heat absorber located in the vessel and a heat radiator located outside of the vessel for radiating heat absorbed by the cooling liquid.

2. The liquid crystal projector according to claim 1, wherein said heat pipe means includes two heat pipes located on both sides of said displaying area.

3. The liquid crystal projector according to claim 1, wherein said heat pipe means includes heat absorbing portions in the vessel and heat exchanging fins formed on the heat absorbing portions.

4. The liquid crystal projector according to claim 1, wherein said heat pipe means is a heat pipe having a heat absorbing portion at the center and heat radiating portions at both ends, said heat absorbing portion being located within the vessel, and said heat radiating portions projecting outwardly from the vessel.

* * * * *